(12) United States Patent
Khalifa

(10) Patent No.: US 11,712,661 B2
(45) Date of Patent: *Aug. 1, 2023

(54) MULTISTAGE MEMBRANE DISTILLATION SYSTEM FOR DISTILLED WATER PRODUCTION

(71) Applicant: KING FAHD UNIVERSITY OF PETROLEUM AND MINERALS, Dhahran (SA)

(72) Inventor: Atia Esmaeil Khalifa, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 16/789,625

(22) Filed: Feb. 13, 2020

(65) Prior Publication Data
US 2020/0179877 A1    Jun. 11, 2020

Related U.S. Application Data

(63) Continuation of application No. 15/936,547, filed on Mar. 27, 2018, now Pat. No. 10,596,521.

(51) Int. Cl.
*B01D 61/36* (2006.01)
*B01D 69/06* (2006.01)
*B01D 61/58* (2006.01)

(52) U.S. Cl.
CPC ......... *B01D 61/364* (2013.01); *B01D 61/368* (2013.01); *B01D 61/58* (2013.01); *B01D 69/06* (2013.01); *B01D 61/366* (2013.01)

(58) Field of Classification Search
CPC .... B01D 61/36; B01D 61/364; B01D 61/366; B01D 61/368
See application file for complete search history.

(56) References Cited

U.S. PATENT DOCUMENTS

| 3,477,917 A | 11/1969 | Rodgers |
| 3,878,054 A | 4/1975 | Rodgers |
| 4,316,772 A | 2/1982 | Cheng et al. |

(Continued)

FOREIGN PATENT DOCUMENTS

| CN | 101730663 B | 7/2013 |
| CN | 105363348 A | 3/2016 |

(Continued)

OTHER PUBLICATIONS

Atia E. Khalifa, "Membrane Distillation for Water Desalination: Air Gap and Water Gap Modules", 8th IWA Specialised Membrane Technology Conference & Exhibition for Water and Wastewater Treatment and Reuse (IWA-MTC), Sep. 2017, pp. 1-8.

(Continued)

*Primary Examiner* — Jonathan Luke Pilcher
(74) *Attorney, Agent, or Firm* — Oblon, McClelland, Maier & Neustadt, L.L.P.

(57) ABSTRACT

A membrane distillation module with a circulating line to circulate a portion of distilled water, which is formed and accumulated in a distillate zone, to enhance a permeate flux of water vapor through a hydrophobic membrane of the membrane distillation module. Various combinations of embodiments of the membrane distillation module are provided.

2 Claims, 12 Drawing Sheets

(56) References Cited

U.S. PATENT DOCUMENTS

| | | |
|---|---|---|
| 5,102,550 A | 4/1992 | Pizzino et al. |
| 5,382,365 A | 1/1995 | Deblay |
| 6,716,355 B1 | 4/2004 | Hanemaaijer et al. |
| 7,608,188 B2 | 10/2009 | Cath et al. |
| 8,029,671 B2 | 10/2011 | Cath et al. |
| 8,029,675 B2 | 10/2011 | Heinzl |
| 8,460,551 B2 | 6/2013 | Al-Arifi et al. |
| 9,039,900 B2 | 5/2015 | Mitra et al. |
| 9,409,129 B2 | 8/2016 | Duke et al. |
| 9,480,950 B2 | 11/2016 | Jeong et al. |
| 10,596,521 B2 * | 3/2020 | Kahlifa ................ B01D 61/364 203/80 |
| 2009/0000939 A1 | 1/2009 | Heinzl |
| 2010/0065496 A1 | 3/2010 | Ma et al. |
| 2010/0300946 A1 | 12/2010 | Nguyen et al. |
| 2011/0290725 A1 | 12/2011 | Al-Arifi et al. |
| 2013/0199976 A1 | 8/2013 | Jeong et al. |
| 2013/0277199 A1 | 10/2013 | Summers et al. |
| 2013/0319923 A1 | 12/2013 | Heinzl |
| 2014/0138299 A1 | 5/2014 | Nijskens et al. |
| 2015/0090647 A1 | 4/2015 | Duke et al. |
| 2015/0336053 A1 | 11/2015 | Dow et al. |

FOREIGN PATENT DOCUMENTS

| | | |
|---|---|---|
| CN | 106219855 A | 12/2016 |
| EP | 1 491 506 A1 | 12/2004 |
| EP | 2 072 112 A1 | 6/2009 |
| EP | 2 165 751 A1 | 3/2010 |
| EP | 2 361 670 A1 | 8/2011 |
| JP | 2012-213773 A | 11/2012 |
| KR | 10-1184787 B1 | 9/2012 |

OTHER PUBLICATIONS

Hongxin Geng, et al., "Study on a new air-gap membrane distillation module for desalination", Desalination, vol. 334, Issue 1, Feb. 3, 2014, pp. 29-38 (Abstract only).

Bhausaheb L. Pangarkar, et al., "Flux enhancement of air gap membrane distillation for desalination of groundwater by surface modification of membrane", International Journal of Chemtech Research, vol. 3, No. 4, Oct.-Dec. 2011, pp. 1816-1820.

Bhausaheb L. Pangarkar, et al., "Performance of Air Gap Membrane Distillation for Desalination of Ground Water and Seawater", World Academy of Science, Engineering and Technology, International Journal of Geological and Environmental Engineering, vol. 5, No. 3, 2011, pp. 177-181.

L. Francis, et al., "Performance evaluation of the DCMD desalination process under bench scale and large scale module operating conditions", Journal of Membrane Science, vol. 455, Dec. 2013, pp. 103-112 (Abstract only).

Atia E. Khalifa, "Water and air gap membrane distillation for water desalination—An experimental comparative study", Separation and Purification Technology, vol. 141, 2015, pp. 276-284.

Esparza, Valeria, Quora Answer to "What are the advantages of aluminum?", www.quora.com, May 5, 2017, available online at: https://www.quora.com/What-are-the-advantages-of-aluminum (Year: 2017).

* cited by examiner

MULTISTAGE MEMBRANE DISTILLATION SYSTEM FOR DISTILLED WATER PRODUCTION

CROSS-REFERENCE TO RELATED APPLICATIONS

The present application is a Continuation of Ser. No. 15/936,547, now allowed, having a filing date of Mar. 27, 2018.

BACKGROUND OF THE INVENTION

Technical Field

The present invention relates to a water-gap membrane distillation module with a circulating line for circulating a portion of distilled water inside the gap, which is produced by the membrane distillation module.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Membrane distillation (MD) is a thermally-driven membrane separation technology for separating water vapor from feed water. In MD processes, saline water with elevated temperature is passed over a micro-porous hydrophobic membrane. The temperature difference across the membrane causes a vapor pressure difference, which leads to a flow of water vapor from the feed side of the membrane to the permeate side through the membrane pores. The permeated vapor further condenses either on the cold side of the membrane, or on a cooling surface arranged therein. The existing surface tension provided by the hydrophobic membrane prevents liquid water to permeate through the pores.

The application of thermally-driven membrane distillation technology, particularly for water desalination purposes, is attracting more attention as a potential technology for small-to-medium scale water treatment plants. The membrane distillation modules generally operate at low temperatures (50-90° C.) and low pressures, and provide a desalinized with nearly 100% salt rejection. Four types of membrane distillation modules are commonly used for water desalination including i) Direct Contact Membrane Distillation (DCMD), ii) Air Gap Membrane Distillation (AGMD), iii) Sweeping Gas Membrane Distillation (SGMD), iv) Vacuum Membrane Distillation (VMD). In all the above mentioned MD modules, the feed is in direct contact with the hydrophobic membrane, however, the design of the permeate side is different.

Water gap membrane distillation (WGMD) (also known as permeate gap or liquid gap) is another type of membrane distillation modules that are developed and used for water desalination purposes [A. E. Khalifa, "Water and air gap membrane distillation for water desalination—An experimental comparative study," Sep. Purif. Technol., vol. 141, pp. 276-284, 2015, incorporated herein by reference in its entirety]. In WGMDs, the gap between the membrane and the cooling surface is filled with distilled water. FIG. 1 illustrates a water-gap membrane distillation module. The mechanism of water evaporation and permeation in the feed side of a WGMD is similar to other types of MD modules; however, in the permeate side, the permeated water vapor condenses immediately at the interface of the membrane surface (i.e. the permeate side of the membrane) and the distilled water in the gap.

Under the same operating and design conditions, the production capacity of a WGMD module is higher than the production capacity of an AGMD module, due to more efficient condensation as a result of insignificant vapor transfer resistance inside the gap [A. E. Khalifa, "Water and air gap membrane distillation for water desalination—An experimental comparative study," Sep. Purif. Technol., vol. 141, pp. 276-284, 2015, which is incorporated herein by reference in its entirety; M. Essalhi and M. Khayet, "Application of a porous composite hydrophobic/hydrophilic membrane in desalination by air gap and liquid gap membrane distillation: A comparative study," Sep. Purif. Technol., vol. 133, pp. 176-186, 2014; V. Ugrozov and L. Kataeva, "Mathematical modeling of membrane distiller with liquid gap," Desalination, vol. 168, no. 1-3, pp. 347-353, 2004; L. Francis, N. Ghaffour, A. A. Alsaadi, and G. L. Amy, "Material gap membrane distillation: A new design for water vapor flux enhancement," J. Memb. Sci., vol. 448, pp. 240-247, 2013]. Due to the existence of water in the gap of WGMD modules, a rate of heat transfer is enhanced. The specific energy consumption (kWh needed to produce one cubic meter of distilled water) of WGMD modules is usually lower compared to AGMD modules due to an enhanced flux of distilled water.

In view of the forgoing, one objective of the present disclosure is to provide a membrane distillation module with a circulating line to circulate a portion of distilled water which is formed and accumulated in a distillate zone to enhance a permeate flux of water vapor through a hydrophobic membrane of the membrane distillation module. Another objective of the present disclosure relates to a membrane distillation module with a circulating line, wherein a portion of the circulating line is arranged in a coolant zone of the membrane distillation module.

BRIEF SUMMARY OF THE INVENTION

According to a first aspect, the present disclosure relates to a membrane distillation module including i) a vessel with an internal cavity, ii) a hydrophobic membrane that divides the internal cavity into a feed zone and a distillate zone, iii) a thermally conductive divider disposed in the distillate zone to separate a coolant zone from the distillate zone such that the distillate zone is sandwiched between the feed zone and the coolant zone, iv) a feed inlet fluidly connected to the feed zone for delivering a feed stream to the feed zone, and a feed outlet fluidly connected to the feed zone for discharging the feed stream from the feed zone, v) a coolant inlet fluidly connected to the coolant zone for delivering a coolant stream to the coolant zone, and a coolant outlet fluidly connected to the coolant zone for discharging the coolant stream from the coolant zone, vi) at least one distillate inlet and at least one distillate outlet fluidly connected to the distillate zone, vii) a circulating line disposed outside of the distillate zone that fluidly connects the at least one distillate outlet to the at least one distillate inlet, viii) a pump fluidly connected to the circulating line, wherein the feed stream comprises water and water vapor, and a portion of the water vapor permeates through the hydrophobic membrane and condenses in the distillate zone in the form of distilled water, and wherein the pump circulates at least a portion of the distilled water in the circulating line.

In one embodiment, the hydrophobic membrane is microporous with an average (mean) pore diameter of 0.1 to 1 µm.

In one embodiment, the hydrophobic membrane is a PTFE membrane with an average pore diameter of 0.1 to 0.6 µm.

In one embodiment, the membrane distillation module further includes at least one nozzle disposed on the at least one distillate inlet to inject the distilled water of the circulating line into the distillate zone.

In one embodiment, at least a portion of the circulating line is disposed in the coolant zone such that the distilled water of the circulating line heat exchanges with the coolant stream.

In one embodiment, the portion of the circulating line disposed in the coolant zone has a coil shape or a zig-zag shape.

In one embodiment, the circulating line is made of a metal or a metal alloy having a thermal conductivity of at least 30 W/(m*K) at a temperature of 20-30° C.

In one embodiment, the thermally conductive divider is made of a metal or a metal alloy having a thermal conductivity of at least 30 W/(m*K) at a temperature of 20-30° C.

In one embodiment, the vessel has a longitudinal axis, which is vertically oriented, wherein the feed inlet and the at least one distillate inlet are arranged proximal to a top of the vessel, and the feed outlet and the at least one distillate outlet are arranged proximal to a bottom of the vessel.

In one embodiment, the vessel has a longitudinal axis, which is vertically oriented, wherein the feed inlet and the coolant outlet are arranged proximal to a top of the vessel, and the feed outlet and the coolant inlet are arranged proximal to a bottom of the vessel.

In one embodiment, the vessel has a longitudinal axis, which is horizontally oriented, a first end, and a second end, wherein the feed inlet and the coolant outlet are arranged on the first end of the vessel, and the feed outlet and the coolant inlet are located on the second end of the vessel.

In one embodiment, the membrane distillation module has a configuration selected from the group consisting of a flat sheet membrane configuration, a hollow fiber membrane configuration, and a spiral wound configuration.

According to a second aspect, the present disclosure relates to a multistage membrane distillation system including a plurality of the membrane distillation modules arranged in series, wherein the feed outlet of each membrane distillation module is fluidly connected to the feed inlet of a subsequent membrane distillation module and the feed stream in delivered to the feed inlet of a first membrane distillation module, wherein the coolant inlets of the plurality of the membrane distillation modules are fluidly connected to a coolant line and the coolant stream is delivered to the coolant inlets with the coolant line in a parallel fashion, wherein the distillate inlets of the plurality of the membrane distillation modules are fluidly connected to the distillate outlets of the plurality of the membrane distillation modules with a branched circulating line, and wherein the distilled water is circulated inside the branched circulating line with the pump.

In one embodiment, at least a portion of the branched circulating line is disposed in at least one coolant zone of the plurality of the membrane distillation modules such that the distilled water inside the branched circulating line heat exchanges with the coolant stream.

According to a third aspect, the present disclosure relates to a multistage membrane distillation system including a plurality of the membrane distillation modules arranged in parallel, wherein the feed inlets of the plurality of the membrane distillation modules are fluidly connected to a feed line and the feed stream is delivered to the feed inlets with the feed line in a parallel fashion, wherein the coolant inlets of the plurality of the membrane distillation modules are fluidly connected to a coolant line and the coolant stream is delivered to the coolant inlets with the coolant line in a parallel fashion, wherein the distillate inlets of the plurality of the membrane distillation modules are fluidly connected to the distillate outlets of the plurality of the membrane distillation modules with a branched circulating line, and wherein the distilled water is circulated inside the branched circulating line with the pump.

According to a fourth aspect, the present disclosure relates to a method of desalinating the feed stream with the membrane distillation module, the method involving i) delivering the feed stream to the feed inlet and delivering the coolant stream to the coolant inlet, wherein a portion of the water vapor permeates through the hydrophobic membrane and condenses in the distillate zone in the form of distilled water, ii) circulating the distilled water in the circulating line.

In one embodiment, a portion of the distillate zone is filled with distilled water before delivering the feed stream.

In one embodiment, the feed stream has a temperature of 30-90° C., and the coolant stream has a temperature of 5-20° C.

In one embodiment, at least a portion of the circulating line is disposed in the coolant zone, wherein the water vapor permeates through the hydrophobic membrane at a permeate flux of 30-140 kg/m$^2$/hr.

In one embodiment, the circulating involves injecting the distilled water into the distillate zone, wherein the water vapor permeates through the hydrophobic membrane at a permeate flux of 30-140 kg/m$^2$/hr.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

Figure 1:
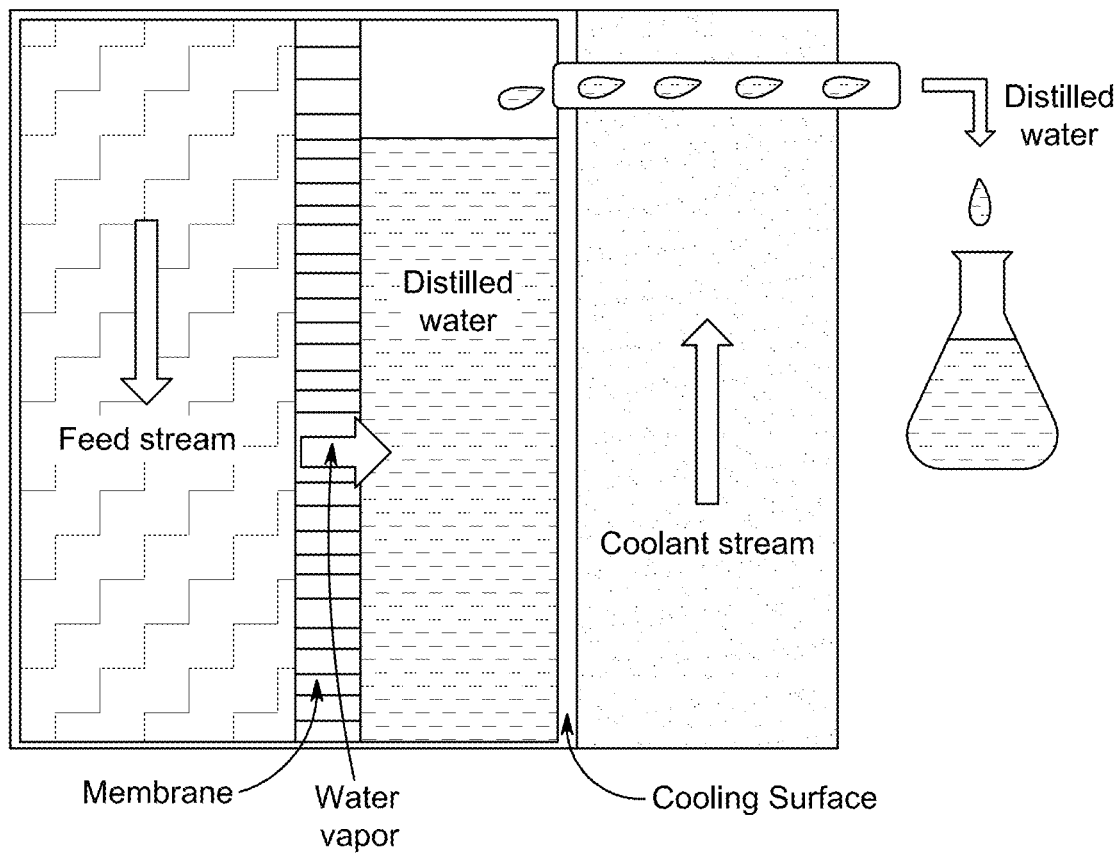
FIG. 1 schematically illustrates a water-gap membrane distillation module.
Figure 2A:
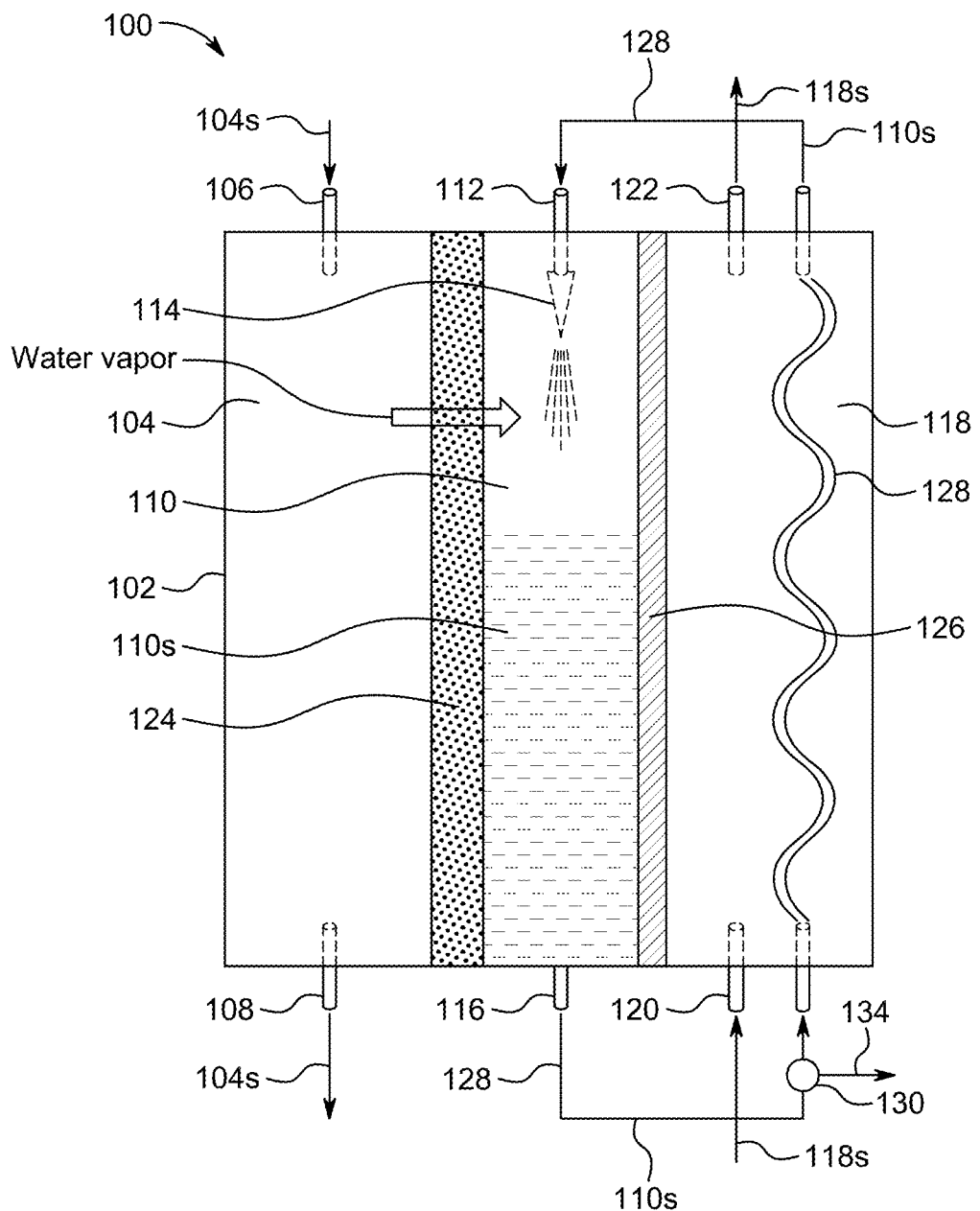
FIG. 2A schematically illustrates the membrane distillation (MD) module of the present disclosure, wherein a circulating line with a coil shape is disposed in a coolant zone of the MD module.
Figure 2B:
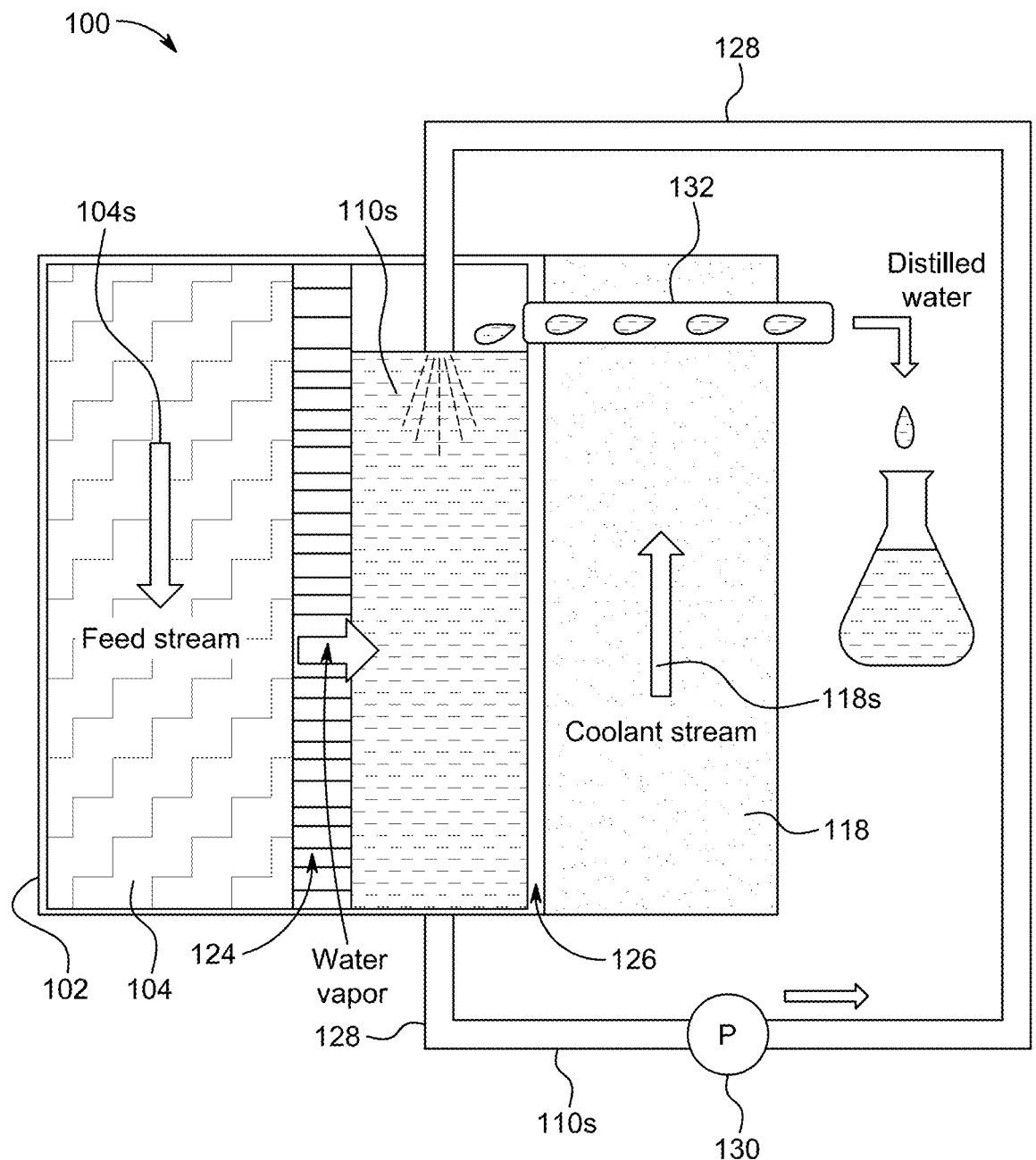
FIG. 2B schematically illustrates the membrane distillation (MD) module, wherein the circulating line is disposed outside of the coolant zone.
Figure 2C:
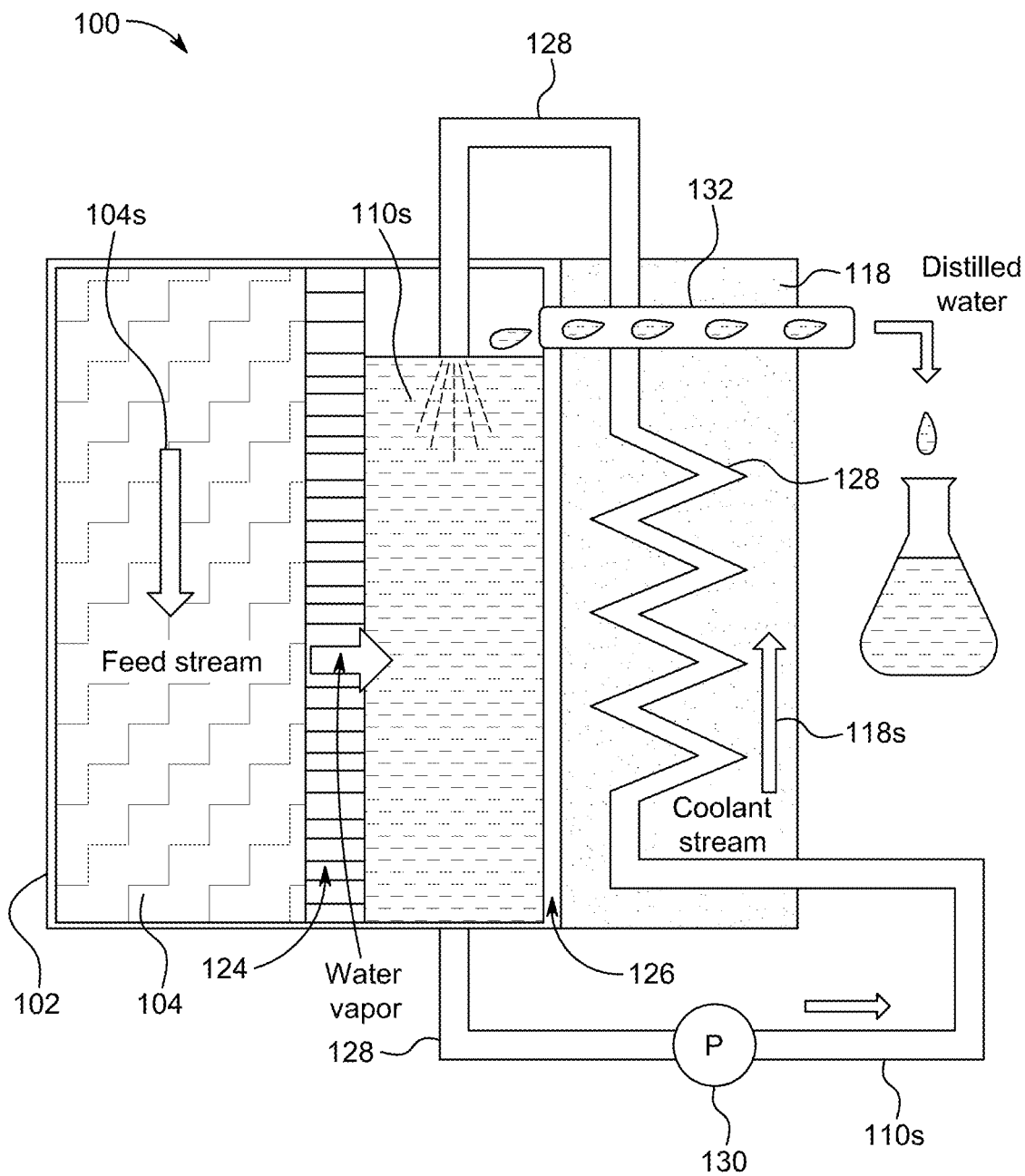
FIG. 2C schematically illustrates the membrane distillation (MD) module, wherein the circulating line with a zig-zag shape is disposed in the coolant zone.

Referring to FIGS. 2A-2C, according to a first aspect, the present disclosure relates to a membrane distillation (MD) module 100. The membrane distillation module of the present disclosure is a kind of a water-gap membrane distillation module, which is described by Khalifa et al. [A. E. Khalifa, "Water and air gap membrane distillation for water desalination—An experimental comparative study," *Sep. Purif. Technol.*, vol. 141, pp. 276-284, 2015, incorporated herein by reference in its entirety]. The membrane distillation module may preferably be utilized for desalinating saline water, e.g. seawater, or producing distilled water, although it may be utilized in other applications to reduce dissolved salts of a water stream or any other liquid stream, deionizing water, etc.

The MD module 100 includes at least a vessel 102 with an internal cavity, a hydrophobic membrane 124, a thermally conductive divider 126, a feed inlet 106 and a feed outlet 108, a coolant inlet 120 and a coolant outlet 122, at least one distillate inlet 112 and at least one distillate outlet 116, a circulating line 128, and a pump 130. Each of the above-mentioned components of the MD module is fully described hereinafter.

Figure 9:
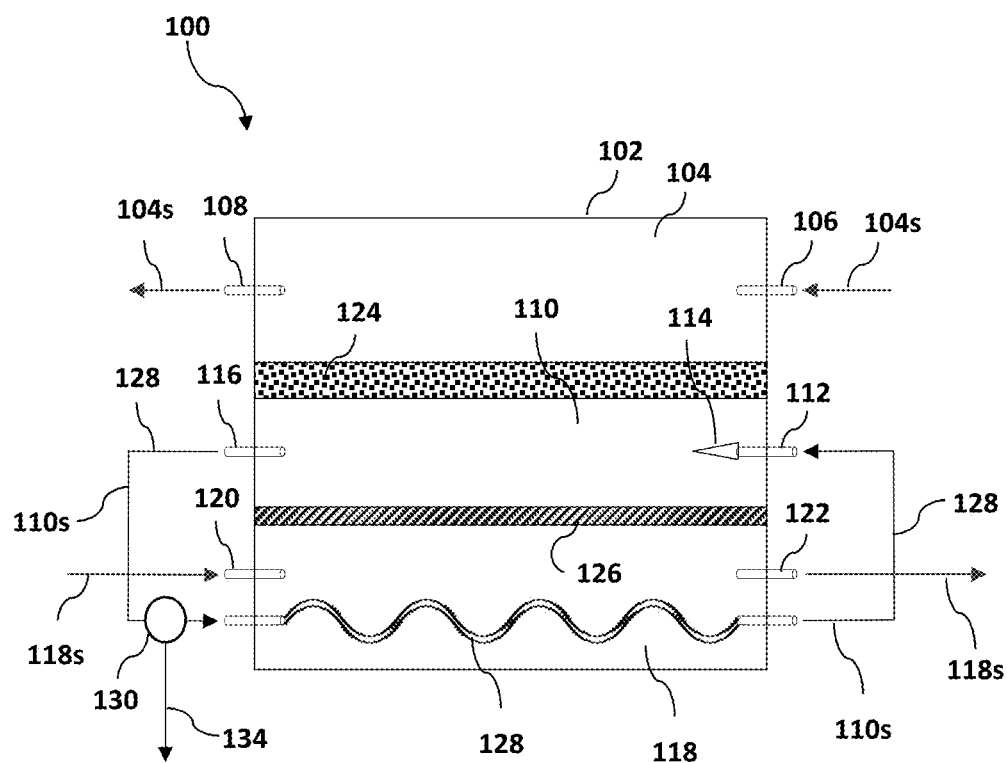
FIG. 9 illustrates the membrane distillation (MD) module, wherein the longitudinal axis is horizontally oriented.

The vessel 102 may have various shapes/geometries including, without limitation, a rectangular shape, a cubical shape, a rectilinear shape, a cylindrical shape, a spherical shape, an oblong shape, a conical shape, or a pyramidal shape. For example, in a preferred embodiment, the vessel 102 has a rectangular shape, and a volume of the internal cavity ranges from 0.01-10 m$^3$, preferably 0.1-5 m$^3$, preferably 0.2-2 m$^3$, more preferably 0.3-1 m$^3$. In view of this embodiment, the vessel 102 may preferably have a longitudinal axis, which is substantially perpendicular to the ground, and the vessel 102 is considered vertically oriented, as shown in FIGS. 2A-2C. In certain embodiments, such as the example shown in FIG. 9, the vessel 102 may have a longitudinal axis, which is substantially parallel to the ground, and the vessel is considered horizontally oriented. The vessel 102 can be made of various types of materials that can withstand moderate process conditions, e.g. a pressure of no more than 4 bars, preferably no more than 3 bars, and a temperature of no more than 120° C., preferably no more than 100° C. Accordingly, in some embodiments, the vessel 102 is made of glass, aluminum or an aluminum alloy, iron or an iron alloy, quartz, stainless steel, nickel steel, chromium steel, aluminum, aluminum alloy, copper and copper alloys, titanium, high density polyethylene (HDPE), low density polyethylene (LDPE), polypropylene, polystyrene, polycarbonate, polymethylmethacrylate, and the like. Preferably, an internal surface of the vessel may be coated with an oxidation resistant layer as known to those skilled in the art to prevent internal surface oxidation. Exemplary oxidation resistant layer may include, without limitation, a polymeric coating such as epoxy, vinyl ester, polyurethane, urea formaldehyde, or a non-polymeric coating such as quartz, alumina, Pyrex®, and the like. The shape of the vessel and the material of constructing the vessel are not meant to be limiting and various shapes and materials may be used in addition or in lieu of the aforementioned ones.

Figure 8:
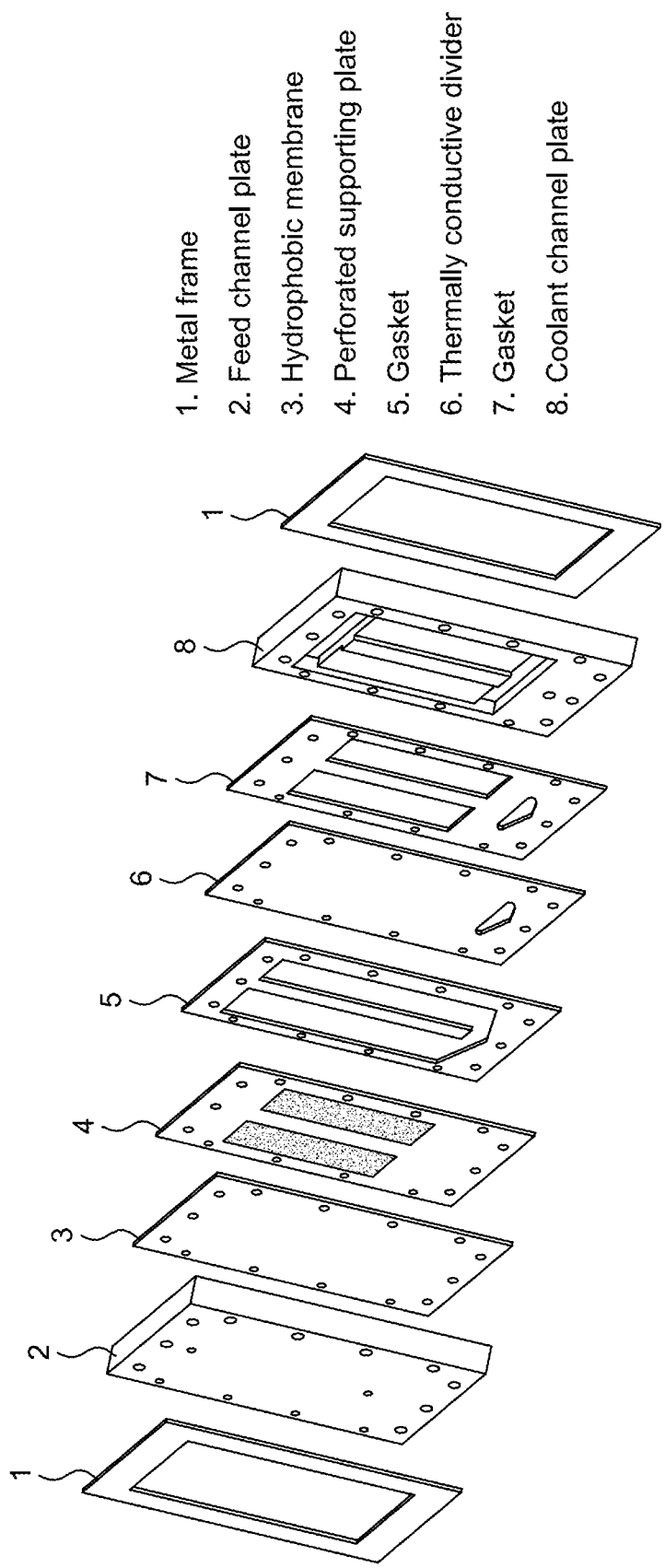
FIG. 8 illustrates a disassembled view of an embodiment of the membrane distillation (MD) module of the present disclosure, wherein the hydrophobic membrane is sandwiched between two metal plates and sealed with gaskets.

The membrane distillation module further includes a hydrophobic membrane 124 arranged inside the vessel 102 such that it divides the internal cavity into a feed zone 104 and a distillate zone 110. The hydrophobic membrane 124 may be arranged parallel or perpendicular relative to the longitudinal axis of the vessel 102. In some preferred embodiments, the vessel 102 is vertically oriented and the hydrophobic membrane 124 is arranged parallel to the longitudinal axis of the vessel, as shown in FIGS. 2A-2C. The hydrophobic membrane 124 may preferably include at least one compound selected from polytetrafluoroethylene (PTFE), polyvinylidene fluoride (PVDF), polypropylene (PP), polyethylene (PE), polyethersulfone (PES), polysulfone (PS), polyacrylonitrile (PAN), polyamide (PA), or any other suitable hydrophobic material as known to those skilled in the art. In some preferred embodiments, the hydrophobic membrane 124 may be sandwiched between some protective layers to protect the hydrophobic layer against damage due to abrasion, for example, due to small particles being present in a liquid stream that is contacted therewith. Said protective layers may preferably also provide mechanical strength to the hydrophobic membrane. For example, in some embodiments, the hydrophobic membrane 124 is sandwiched between two stainless steel mesh structures that substantially cover a surface of the hydrophobic membrane. In one embodiment, the hydrophobic membrane 124 is supported by a perforated supporting structure from one side, as shown in FIG. 8. In one embodiment, the hydrophobic membrane 124 is sandwiched between two channel plates each with a thickness of 0.1-10 mm, preferably 0.5-8 mm, preferably 1.0-5.0 mm, as shown in FIG. 8, and tightly secured and sealed in place by sealing means as known to those skilled in the art, e.g. gaskets or O-rings.

Hydrophobicity is a property of a material's surface, i.e. a measure of wetting properties of a material's surface. Hydrophobicity may be quantified with contact angle of a water droplet on a horizontal surface upon which the drop of water is placed. In a number of technology fields and industrial applications, materials with one or more hydrophobic surfaces are advantageous due to difficulty to wet and self-cleaning properties. In terms of the present disclosure, a hydrophobic surface is a surface that provides a water contact angle of greater than 90°. Accordingly, the hydrophobicity surface of the hydrophobic membrane 124 has a water contact angle in the range of 90° to about 150°, preferably from about 100° to about 145°. The hydrophobicity surface of the hydrophobic membrane 124 may also provide a reduced biofouling effect.

The hydrophobic membrane 124 is arranged inside the vessel 102 with a sealing element as known to those skilled in the art to prevent any leakage from the feed zone 104 to the distillate zone 110. The sealing element may be a soft material so that it can be compressed to provide a seal. For example, the sealing element may be made from a natural rubber, a synthetic rubber or any other suitable soft material that can provide a seal. Examples of the synthetic rubber include thermoplastic vulcanizates (TPV) and ethylene propylene diene monomers (EPDM). Both TPVs and EPDM may be inject-molded. In some embodiments, a layer of glue may be used to provide a seal. Suitable glues that may be used include polyurethane, silicone, epoxy and polyacrylate glues. In certain embodiments, a seal may be provided with a gasket or O-rings, for example, a rubber gasket made of the synthetic rubber as mentioned previously.

In certain embodiments, the hydrophobic membrane 124 includes a hydrophobic layer disposed on a polymeric substrate. Exemplary polymeric substrates may include, without limitation, polypropylene, polyethylene, polysulfone, polyacrylonitrile, polyamide, polyethylene terephthalate, polybutylene terephthalate, polyester, polyacrylate and polymethacrylate, polyvinyl chloride, polyimide, polyethernitrile, polyethersulfone, polystyrene, polycarbonate, poly methyl methacrylate, and any combinations thereof. Exemplary hydrophobic layers may include a fluoropolymer to provide hydrophobicity, for example, polytetrafluoroethylene (PTFE), polyvinylidene fluoride (PVDF), tetrafluoroethylene (TFE), chlorotrifluoroethylene (CTFE), hexafluoropropylene (HFP), perfluoropropylvinylether (PPVE), perfluoromethylvinylether (PMVE), and the like.

In a preferred embodiment, the hydrophobic membrane 124 is microporous with an average (mean) pore diameter of 0.1-1 µm, preferably 0.03-5 µm, preferably 0.05-2 µm, preferably 0.08-1 µm, preferably 0.1-0.8 µm, preferably 0.15-0.5 µm, preferably 0.2-0.3 µm. A microporous membrane may preferably refer to a membrane having an open spongy morphology of controlled pore size ranging from 0.03-5 µm, preferably 0.05-2 µm, preferably 0.08-1 µm, preferably 0.1-0.8 µm, preferably 0.15-0.5 µm, preferably 0.2-0.3 µm. In some preferred embodiments, the hydrophobic membrane 124 is a PTFE membrane with an average pore diameter of 0.1-0.6 µm, preferably 0.2-0.5 µm, preferably 0.3-0.45 µm. The hydrophobic membrane 124 may have a thickness in the range of 0.1 to 5 mm, preferably 0.5 to 4 mm, more preferably 1 to 3 mm. In certain embodiments, the hydrophobic membrane 124 may have a thickness of 1 to 50 µm, preferably 2 to 30 µm, more preferably 3 to 20 µm, even more preferably 5 to 10 µm. In certain embodiments, the hydrophobic membrane 124 includes the hydrophobic layer disposed on the polymeric substrate, wherein a thickness of the hydrophobic membrane 124 may be in the range of 10 to 500 µm, preferably 50 to 300 µm, more preferably 100 to 200 µm, even more preferably about 105 to 160 µm. In addition, the hydrophobic membrane 124 may preferably endure a pressure (i.e. a liquid entry, e.g. the feed stream, pressure) of up to 4 bars, preferably up to 3 bars, preferably in the range of 0.5-2.5 bars. In some embodiments, an effective surface area of the hydrophobic membrane 124 may be in the range of 0.05-5 m$^2$, preferably 0.1-4 m$^2$, preferably 0.5-3 m$^2$, preferably 1-2 m$^2$. In some other embodiments, the effective surface area of the hydrophobic membrane 124 is less than 0.05 m$^2$, preferably 0.001-0.05 m$^2$, preferably 0.005-0.01 m$^2$, preferably around 0.007 m$^2$. The term "effective surface area" as used here refers to a surface area of the hydrophobic membrane 124 which is in contact with the feed stream 104$s$ and permeates water vapor to the distillate zone 110.

The type of hydrophobic membrane is not meant to be limiting and various types of hydrophobic membranes as known to those skilled in the art may alternatively be utilized here.

The feed zone 104 as used in this disclosure refers to a space inside the vessel 102, wherein a feed stream 104$s$ is configured to pass therethrough. Also, the distillate zone 110 as used in this disclosure refers to a space inside the vessel 102, wherein the water vapor that is permeated through the hydrophobic membrane 124 is condensed and accumulated in the form of distilled water 110$s$.

A volume of the feed zone 104 may be 20-50%, preferably 25-45%, preferably 30-40% of the total volume of the vessel 102. A volume of the distillate zone 110 may be 5-50%, preferably 10-30%, preferably 15-20% of the total volume of the vessel 102. In one embodiment, the volume of the distillate zone 110 defines a distance between the hydrophobic membrane 124 and the thermally conductive divider 126. Accordingly, in certain embodiments, the distance between the hydrophobic membrane 124 and the thermally conductive divider 126 is in the range of 1 mm to 20 cm, preferably 2 mm to 5 cm, preferably 4 to 15 mm, preferably 5 to 12 mm.

The feed stream 104$s$ as used in this disclosure refers to any water stream that is delivered to the feed zone 104 and includes water and water vapor and contains more salinity than distilled water. Accordingly, in some embodiments, the feed stream 104$s$ is seawater that contains about 3-5% by weight of dissolved salts. In some embodiments, the feed stream 104$s$ is brackish water that contains about 0.05-3% by weight of dissolved salts. In some embodiments, the feed stream 104$s$ is brine, which contains greater than 5% by weight of dissolved salts (as presented herein % by weight is relative to the total solution weight). Salts that may be present in the feed stream 104$s$ may include, without limitation, cations of sodium, magnesium, calcium, potassium, ammonium, and iron, and anions of chloride, bicarbonate, carbonate, sulfate, sulfite, phosphate, iodide, nitrate, acetate, citrate, fluoride, and nitrite.

When the feed stream 104$s$ is delivered to the feed zone 104, a portion of the water vapor permeates through the hydrophobic membrane 124 and condenses in the distillate zone 110 in the form of distilled water 110$s$.

In terms of the present disclosure, in a preferred embodiment the distilled water 110$s$ is a kind of water that is substantially free from dissolved salts, e.g. the abovementioned salts. The term "substantially free" as used here may refer to a concentration of less than 100 ppm, preferably less than 50 ppm, preferably less than 40 ppm, preferably less than 20 ppm, preferably less than 10 ppm, preferably less than 5 ppm, preferably less than 2 ppm, preferably less than 1 ppm, preferably less than 0.5 ppm, preferably less than 0.2 ppm, preferably less than 0.1 ppm of dissolved salts.

In a preferred embodiment, a weight ratio of dissolved salt in the distilled water 110$s$ to the dissolved salt in the feed stream 104$s$ is in the range of 1:10 to 1:1000, preferably 1:50 to 1:900, preferably 1:100 to 1:800. In view of that, the hydrophobic layer preferably effectively separates dissolved salts present in the feed stream 104$s$.

The distilled water 110$s$ may be collected from the distillate zone 110 in various ways. For example, in one embodiment, a distilled water canal 132 is fluidly connected to the distillate zone 110 to discharge the accumulated distilled water when it reaches to a certain liquid level in the distillate zone, as shown in FIGS. 2B and 2C. In some embodiments, a distilled water line 134 may be fluidly connected to the circulating line 128, and delivers a portion of the distilled water 110s to a downstream processing unit, as shown in FIG. 2A. In view of this embodiment, a control system may preferably be adapted to control a flow rate of the distilled water 110s in the distilled water line 134 to make sure the flow rate does not exceed a predetermined flow rate and that a liquid level of the distilled water 110s in the distillate zone 110 does not drop below certain liquid levels during operating the MD module 100.

The distilled water 110s that is collected from the distilled water canal 132 and/or the distilled water line 134 may be delivered to an industrial water treatment plant and/or a residential water treatment plant, wherein the distilled water may be further processed to be utilized for drinking, or may be used in air conditioning or refrigerating systems in residential or industrial applications. In some embodiments, said distilled water may be utilized in various chemical reactions and processes where distilled water is demanded as known to those skilled in the art, e.g. cement processing, chemical cracking, oil refining processing, mineral processing, steam generating, methanol processing, LNG processing, sugar refining, power plants, mining applications, etc.

To deliver the feed steam to the feed zone 104, the membrane distillation module further includes a feed inlet 106 fluidly connected to the feed zone 104. In addition, the membrane distillation module includes a feed outlet 108 fluidly connected to the feed zone 104 for discharging the feed stream 104s from the feed zone 104.

In some embodiments, the feed inlet 106 and the feed outlet 108 are substantially the same, wherein each is a cylindrical canal with a diameter of 1-100 mm, preferably 5-80 mm, preferably 10-50 mm, preferably 12-25 mm. The feed inlet 106 and the feed outlet 108 are configured to operate at various temperatures and pressures, preferably a pressure of no more than 4 bars, preferably no more than 3 bars, and a temperature of no more than 120° C., preferably no more than 100° C. In some preferred embodiments, an internal surface of the feed inlet 106 and the feed outlet 108 may be coated with the oxidation resistant layer, as described previously, to prevent internal surface oxidation.

Each of the feed inlet 106 and the feed outlet 108 may be arranged perpendicular, parallel, or at a certain inclination angle relative to the longitudinal axis of the vessel. For example, in one embodiment, the vessel 102 is vertically oriented, wherein the feed inlet 106 and the feed outlet 108 are arranged parallel to the longitudinal axis of the vessel 102, as depicted in FIG. 2A. In some alternative embodiments, the feed inlet 106 and the feed outlet 108 may be disposed perpendicular to the longitudinal axis of the vessel 102.

The membrane distillation module further includes at least one distillate inlet 112 and at least one distillate outlet 116 fluidly connected to the distillate zone 110. Said distillate outlet 116 is configured to discharge the distilled water 110s from the distillate zone 110, and the distillate inlet 112 is configure to deliver distilled water 110s to the distillate zone 110.

In some embodiments, the distillate inlet 112 and the distillate outlet 116 are substantially the same, wherein each distillate inlet is a cylindrical canal with a diameter of 1-100 mm, preferably 5-80 mm, preferably 10-50 mm, preferably 12-25 mm. The distillate inlet 112 and the distillate outlet 116 are configured to operate at various temperatures and pressures, preferably a pressure of no more than 4 bars, preferably no more than 3 bars, and a temperature of no more than 30° C., preferably no more than 20° C. In some preferred embodiments, an internal surface of the distillate inlet 112 and the distillate outlet 116 may be coated with the oxidation resistant layer, as described previously, to prevent internal surface oxidation.

Each of the distillate inlet 112 and the distillate outlet 116 may be arranged perpendicular, parallel, or at a certain inclination angle relative to the longitudinal axis of the vessel. For example, in one embodiment, the vessel 102 is vertically oriented, wherein the distillate inlet 112 and the distillate outlet 116 are arranged parallel to the longitudinal axis of the vessel 102, as depicted in FIG. 2A. In some alternative embodiments, the distillate inlet 112 and the distillate outlet 116 may be disposed perpendicular to the longitudinal axis of the vessel 102. In one embodiment, two distillate inlets are fluidly connected to a top of the distillate zone, and two distillate outlets are fluidly connected to a bottom of the distillate zone.

In some preferred embodiments, the membrane distillation module further includes at least one nozzle 114 disposed on the at least one distillate inlet 112 to inject the distilled water 110s into the distillate zone 110. The nozzle 114 may be any type as known to those skilled in the art, e.g. a hydro jet nozzle, a propelling nozzle, a magnetic nozzle, a spray nozzle such as a swirler, etc. The type of the nozzle as used here is not meant to be limiting and various other types of nozzle may be used alternatively. The nozzle 114 is used to inject/jet the distilled water 110s into the distillate zone 110 to form turbulence in the distilled water, which is accumulated in the distillate zone 110. The turbulence may effectively enhance a permeate flux of water vapor through the hydrophobic membrane 124. For example, in some embodiment, the presence of the nozzle 114 in a MD module increases the permeate flux of water vapor through the hydrophobic membrane by 30-60%, preferably 35-50%, preferably 40-45%, relative to a MD module that does not include the nozzle.

The membrane distillation module further includes a thermally conductive divider 126 disposed in the distillate zone 110 to separate a coolant zone 118 from the distillate zone 110 such that the distillate zone 110 is sandwiched between the feed zone 104 and the coolant zone 118. The thermally conductive divider 126 is preferably planar and provides a cool surface to cool the distilled water accumulated in the distilled zone for better condensation of water vapor that permeates through the hydrophobic membrane. In one embodiment, the thermally conductive divider 126 is a duct with a rectangular, a circular, or an elliptical cross-section. The thermally conductive divider 126 is preferably impermeable to water molecules and, in some preferred embodiments, is made of a thermally conductive material selected from copper, brass, iron, cast iron, steel, carbon steel, aluminum, lead, bronze, silver, tin, titanium, tungsten, chromium, cobalt, nickel, iridium, gold, zinc, and alloys thereof. In a preferred embodiment, the thermally conductive divider 126 is made of a metal or a metal alloy having a thermal conductivity of at least 30 W/(m*K), preferably at least 40 W/(m*K), preferably at least 50 W/(m*K), preferably at least 100 W/(m*K), at a temperature of 20-30° C., preferably 22-28° C., preferably about 25° C. The thermally conductive divider 126 may be arranged parallel or perpendicular relative to the longitudinal axis of the vessel 102. For example, in some preferred embodiments, the vessel 102 is vertically oriented and the thermally conductive divider 126 is planar with a longitudinal axis, which is arranged parallel to the longitudinal axis of the vessel 102, as shown in FIGS. 2A-2C.

The thermally conductive divider 126 is arranged inside the vessel 102 with the sealing element, as described previously, to prevent any leakage from the coolant zone 118 to the distillate zone 110. In some embodiments, a layer of glue may be used to provide a seal. Suitable glues that may be used include polyurethane, silicone, epoxy and polyacrylate glues. In certain embodiments, the thermally conductive divider 126 is welded to the vessel 102 and further coated with the glue and/or the sealing element.

The coolant zone 118 as used in this disclosure refers to a space inside the vessel 102, wherein a coolant stream 118s is configured to pass therethrough. A volume of the coolant zone 118 may be 20-50%, preferably 25-45%, preferably 30-40% of the total volume of the vessel 102.

The coolant stream 118s as used in this disclosure refers to any fluid stream, preferably a cool-water stream with a temperature of no more than 25° C., preferably no more than 20° C., preferably 5-20° C., preferably 10-15° C., which is configured to cool down the thermally conductive divider 126 to cool the distilled water 110s in the distillate zone 110. Alternative coolant streams as known to those skilled in the art may be used in lieu of the cool-water stream. Examples of the coolant stream may include, without limitation, a cooled air, a refrigerant such as ammonia, a cooled nitrogen gas, liquid nitrogen, a cooled argon gas, etc. The coolant stream may be delivered from an upstream refrigeration system or an air cooler, which may be electrically powered, mechanically powered, or preferably solar powered.

In some preferred embodiments, the pump 130 is powered with solar energy. Accordingly, solar radiation rotates an electric drive motor by means of photovoltaic solar cells, and the drive motor further rotates the pump.

The membrane distillation module further includes a coolant inlet 120 fluidly connected to the coolant zone 118 for delivering the coolant stream 118s to the coolant zone 118, and a coolant outlet 122 fluidly connected to the coolant zone 118 for discharging the coolant stream 118s from the coolant zone 118.

In some embodiments, the coolant inlet 120 and the coolant outlet 122 are substantially the same, wherein each is a cylindrical canal with a diameter of 1-100 mm, preferably 5-80 mm, preferably 10-50 mm, preferably 12-25 mm. The coolant inlet 120 and the coolant outlet 122 are configured to operate at various temperatures and pressures, preferably a pressure of no more than 4 bars, preferably no more than 3 bars, and a temperature of no more than 30° C., preferably no more than 20° C. In some preferred embodiments, an internal surface of the coolant inlet 120 and the coolant outlet 122 are coated with the oxidation resistant layer, as described previously, to prevent internal surface oxidation.

Each of the coolant inlet 120 and the coolant outlet 122 may be arranged perpendicular, parallel, or at a certain inclination angle relative to the longitudinal axis of the vessel. For example, in one embodiment, the vessel 102 is vertically oriented, wherein the coolant inlet 120 and the coolant outlet 122 are arranged parallel to the longitudinal axis of the vessel 102, as depicted in FIG. 2A. In some alternative embodiments, the coolant inlet 120 and the coolant outlet 122 may be disposed perpendicular to the longitudinal axis of the vessel 102.

The membrane distillation module 100 further includes a circulating line 128 disposed outside of the distillate zone 110 and fluidly connects the distillate outlet 116 to the distillate inlet 112. The circulating line 128 is configured to circulate a portion of the distilled water 110s, which is accumulated in the distillate zone 110. Circulation of the distilled water 110s may form a laminar or a turbulent flow of the distilled water 110s in the distillate zone 110, depending on the circulation flow rate and pressure, and may further enhance the permeate flux of water vapor through the hydrophobic membrane 124. In some embodiments, the presence of the circulating line 128 in the MD module 100 for circulating the distilled water 110s enhances the permeate flux of water vapor through the hydrophobic membrane by 20-40%, preferably 25-35%, preferably about 30%, relative to a MD module that does not include the circulating line. In some preferred embodiments, the MD module 100 includes the circulating line 128 and the nozzle 114, wherein the permeate flux of water vapor through the hydrophobic membrane 124 is 30-70%, preferably 45-65%, preferably 50-60% higher than the permeate flux of a MD module that does not include the circulating line and the nozzle. In some other preferred embodiments, the feed stream has a temperature of 50-90° C., preferably 60-90° C., preferably 70-90° C. and the MD module 100 includes the circulating line 128 and the nozzle 114, wherein the permeate flux of water vapor through the hydrophobic membrane 124 is 30-140 kg/m$^2$/h, preferably 50-135 kg/m$^2$/h, preferably 70-130 kg/m$^2$/h.

The presence of distilled water 110s in the distillate zone 110 may reduce an efficiency of the MD module 100 by dissipating thermal energy and reducing a cooling effect in the coolant zone 118, which is provided by the coolant stream 118s and the thermally conductive divider 126. In view of that, in some preferred embodiments, at least a portion of the circulating line 128 is disposed in the coolant zone 118, as shown in FIGS. 2A and 2C. Accordingly, the distilled water 110s of the circulating line 128 heat exchanges with the coolant stream 118s in a continuous fashion to continuously keep the temperature of the distilled water 110s close to the temperature of the coolant stream 118s (i.e. a temperature of no more than 25° C., preferably no more than 20° C., preferably 5-20° C., preferably 10-15° C.). In some preferred embodiments, an efficiency of the MD module 100, which includes the circulating line 128 disposed in the coolant zone 118, is at least 10%, preferably 20-60%, preferably 30-50% higher than the efficiency of a MD module that does not include a circulating line. In one embodiment, an efficiency of the MD module 100, which includes the circulating line 128 disposed in the coolant zone 118, is at least at 10%, preferably 15-40%, preferably 20-30% higher than the efficiency of a MD module that has a circulating line, but the circulating line is not disposed in the coolant zone. The term "efficiency" as used herein refers to specific energy consumption of the MD module 100, which is total power consumption per one cubic meter of the distilled water formed. The total power consumption is a sum of the power consumption for operating the pump 130, the power consumption for heating the feed stream 104s, and the power consumption for reducing the temperature of the coolant stream 118s.

The portion of the circulating line 128, which is disposed in the coolant zone 118, may have various shapes to provide an extended contact surface area. For example, in some preferred embodiments, said portion of the circulating line has a coil shape as depicted in FIG. 2A, a zig-zag shape as depicted in FIG. 2C, a helix shape, a serpentine shape, etc.

In one embodiment, the circulating line 128 is a tube with a rectangular, a circular, or an elliptical cross-section. The circulating line 128 is preferably impermeable to water molecules and, in some preferred embodiments, is made of a thermally conductive material selected from copper, brass, iron, cast iron, steel, carbon steel, aluminum, lead, bronze, silver, tin, titanium, tungsten, chromium, cobalt, nickel, iridium, gold, zinc, and alloys thereof. In a preferred embodiment, the circulating line 128 is made of a metal or a metal alloy having a thermal conductivity of at least 30 W/(m*K), preferably at least 40 W/(m*K), preferably at least 50 W/(m*K), preferably at least 100 W/(m*K), at a temperature of 20-30° C., preferably 22-28° C., preferably about 25° C. In some preferred embodiments, an internal surface of the circulating line 128 is coated with an oxidation resistant, as described previously, to prevent internal surface oxidation.

In one embodiment, an internal diameter of the circulating line 128 ranges from about 0.1-20 cm, preferably 0.5-10 cm, preferably 1-5 cm. In one embodiment, a thickness of the circulating line 128 ranges from about 1-50 mm, preferably 2-30 mm, preferably 3-20 mm, preferably 4-10 mm. In some embodiments, the circulating line 128 is configured to bear a pressure of up to 1 bar, preferably up to 2 bars, preferably up to 3 bars, preferably up to 5 bars, and endure a temperature of up to 20° C., preferably up to 30° C., more preferably up to 50° C.

Figure 3:
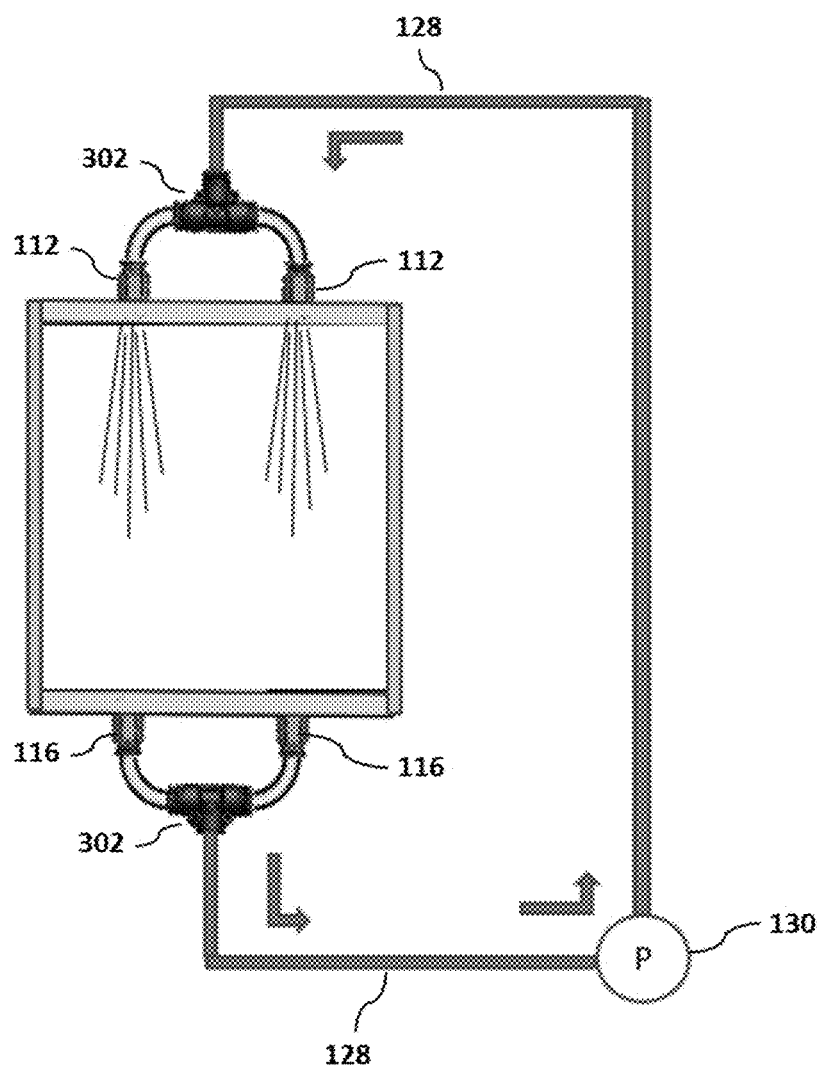
FIG. 3 schematically illustrates a distillate zone of the MD module with two distillate inlets and two distillate outlets, and a circulating line that fluidly connects the distillate inlets to the distillate outlets.

In some embodiments, the MD module 100 includes more than one distillate inlet 112 and more than one distillate outlet 116, wherein said distillate inlets and outlets are fluidly connected to the circulating line 128 with multiple-way tube connectors 302, as shown in FIG. 3.

The membrane distillation module further includes a pump 130 disposed on the circulating line 128 to circulate the distilled water 110s in the circulating line 128. The phrase "circulating the distilled water 110s in the circulating line 128" as used in this disclosure involves sucking the distilled water 110s and delivering it to the distillate inlet 112, wherein the distilled water 110s is preferred injected into the distillate zone 110 with the nozzle 114.

The type of the pump that is used in this disclosure is not meant to be limiting and various types of pumps as known to those skilled in the art may be utilized here. For example, in some embodiments, the pump 130 is a positive displacement pump, an impulse pump, a centrifuge pump, a rotary lobe pump, a progressive cavity pump, a rotary gear pump, a piston pump, a diaphragm pump, a screw pump, a gear pump, a hydraulic pump, a rotary vane pump, a peristaltic pump, a rope pump, and the like. The pump 130 may be electrically powered or mechanically powered, e.g., with a shaft of a turbine. The power consumption of the pump 130 may preferably not exceeding 100 kWh, preferably in the range of 0.5-20 kWh, preferably 1.0 to 15 kWh, preferably 2.0 to 10 kWh.

In some preferred embodiments, the pump 130 is powered with solar energy. Accordingly, solar radiation rotates an electric drive motor by means of photovoltaic solar cells, and the drive motor further rotates the pump 130. Alternatively, solar radiation may produce steam in heat recovery steam generators, or any other types of steam generators. The steam further rotates steam turbines and generates a shaft work, and the shaft work operates the pump 130. Using solar energy to power the pump may be advantageous particularly for remote areas, e.g. islands, deserts, remote villages, etc. where solar radiation is abundant and any form of energy is not accessible. In addition, the use of solar energy may provide manufacturing compact/portable MD modules as described in the present disclosure in different sizes, e.g. in a pilot scale or a bench scale, particularly for remote areas where a power plant is not accessible.

Said inlets and outlets may be disposed at various locations in the MD module 100, preferably with respect to the efficiency of the MD module.

For example, in a preferred embodiment, the vessel 102 is vertically oriented, wherein the feed inlet 106 and the distillate inlet 112 are arranged proximal to a top of the vessel 102, and the feed outlet 108 and the distillate outlet 116 are arranged proximal to a bottom of the vessel 102. Accordingly, a direction of the feed stream 104s is co-current relative to a direction of the distilled water 110s when circulated. In another preferred embodiment, the vessel 102 is vertically oriented, wherein the feed inlet 106 and the coolant outlet 122 are arranged proximal to the top of the vessel 102, and the feed outlet 108 and the coolant inlet 120 are arranged proximal to the bottom of the vessel 102. The distillate inlet 112 may be arranged proximal to the bottom, preferably proximal to the top of the vessel 102, and the distillate outlet 116 is arranged at the opposite end of the vessel 102. The arrangement in view of this embodiment is shown in FIG. 2A. In view of that, a direction of the feed stream 104s in the feed zone 104 is counter-current relative to a direction of the coolant stream 118s in the coolant zone 118. In one embodiment, the vessel 102 is horizontally oriented with a first end and a second end, wherein the feed inlet 106 and the coolant outlet 122 are arranged on the first end of the vessel 102, and the feed outlet 108 and the coolant inlet 120 are located on the second end of the vessel 102. Accordingly, the direction of the feed stream 104s is counter-current relative to the direction of the coolant stream 118s. In view of this embodiment, the distillate inlet 112 may be arranged on the first end or the second end of the vessel, and the distillate outlet 116 is arranged at the opposite end. As used here, when an inlet/outlet is arranged proximal to a bottom of a vertically oriented vessel, the inlet/outlet is considered being in a region that is located at a height of less than 20%, preferably less than 15%, preferably less than 10% of the total height of the vessel, when measured from the bottom of the vessel, with 0% being the bottom and 100% being the top of the vessel. Similarly, when an inlet/outlet is arranged proximal to a top of a vertically oriented vessel, the inlet/outlet is considered being in a region that is located at a height of more than 80%, preferably more than 85%, preferably more than 90% of the total height of the vessel, when measured from the bottom of the vessel, with 0% being the bottom and 100% being the top of the vessel.

Referring to FIG. 8, in some embodiments, the MD module includes a feed channel plate, which is arranged substantially parallel to a coolant channel plate, wherein the hydrophobic membrane is tightly sandwiched between the feed channel plate and the coolant channel plate, and further secured in place with metal frames and sealed with a plurality of gaskets and supporting plates. The feed channel plate and the coolant channel plate may preferably be made of a material with low thermal conductivity, e.g., PVC, HDPE, etc. to minimize a heat loss from the MD module to the surrounding.

Figure 4A:
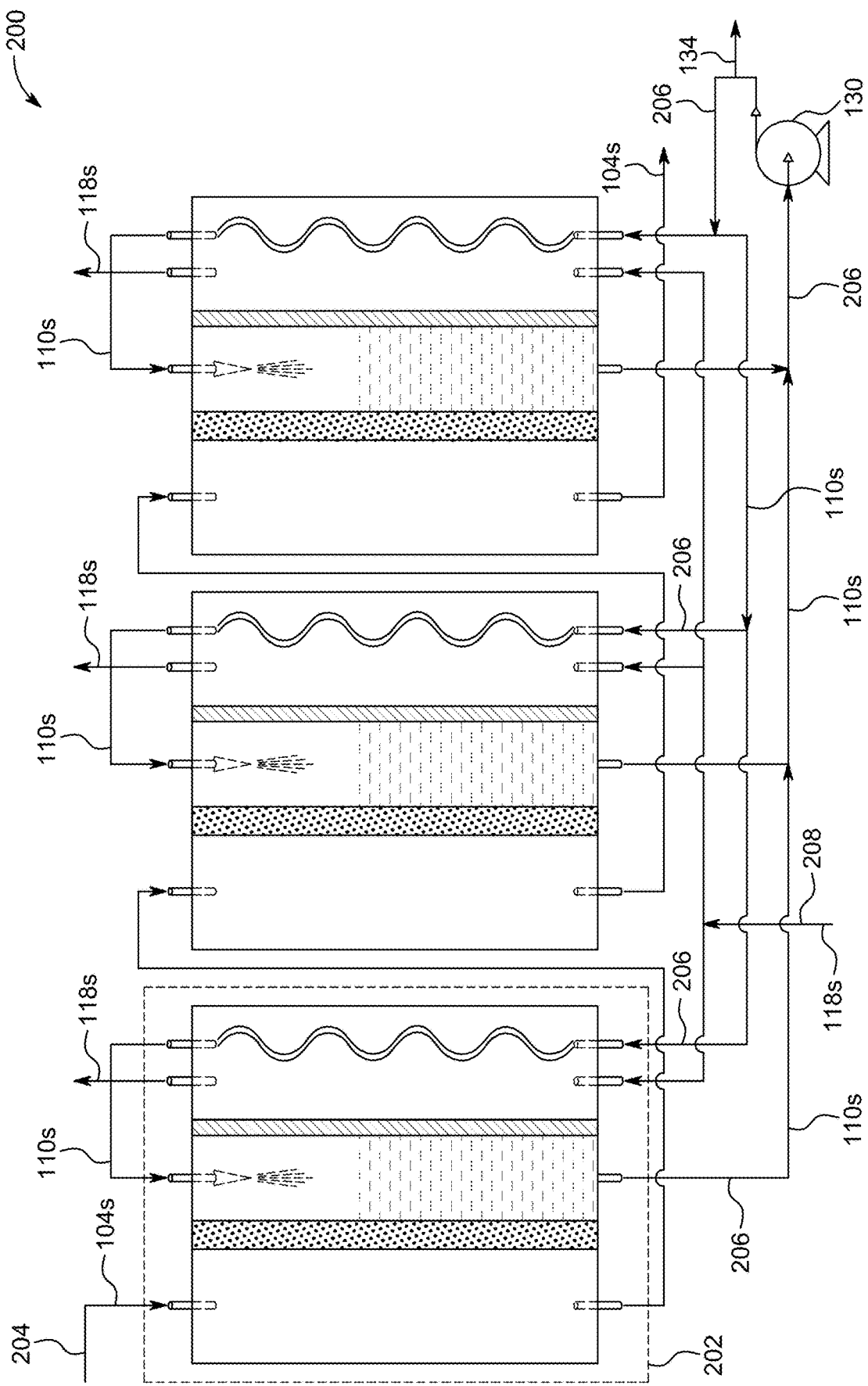
FIG. 4A schematically illustrates a multistage membrane distillation (MD) system with a plurality of MD modules that are fluidly connected in series relative to a feed line.

Referring now to FIG. 4A, according to a second aspect, the present disclosure relates to a multistage membrane distillation system 200 including a plurality of the MD modules arranged in series relative to a feed line 204, wherein the feed outlet of each MD module is fluidly connected to the feed inlet of a subsequent MD module. Accordingly, the feed stream 104s is delivered to the feed inlet of a first membrane distillation module 202 with the feed line 204. Also, the coolant inlets of the plurality of the MD modules are fluidly connected to a coolant line 208, and therefore the coolant stream 118s is delivered to the coolant inlets in a parallel fashion, as shown in FIG. 4A, that depicts a series feed/parallel coolant multistage arrangement. The distillate inlets of the plurality of the membrane distillation modules are fluidly connected to the distillate outlets of the plurality of the membrane distillation modules with a branched circulating line 206, wherein the distilled water 110s of the plurality of the MD modules is combined (e.g. using a plurality of multiple-way tube connectors and lines), pumped with the pump 130, and further distributed among the distillate inlets of the plurality of the MD modules, as shown in FIG. 4A.

The branched circulating line 206 is preferably made of substantially the same material as the circulating line 128, with substantially the same diameter and thickness. In one embodiment, the branched circulating line 206 includes a plurality of multiple-way tube connectors and lines.

In some preferred embodiments, at least a portion of the branched circulating line 206 is disposed in at least one coolant zone of the plurality of the membrane distillation modules such that the distilled water 110s heat exchanges with the coolant stream 118s of each of the plurality of the MD modules, as shown in FIG. 4A.

Figure 4B:
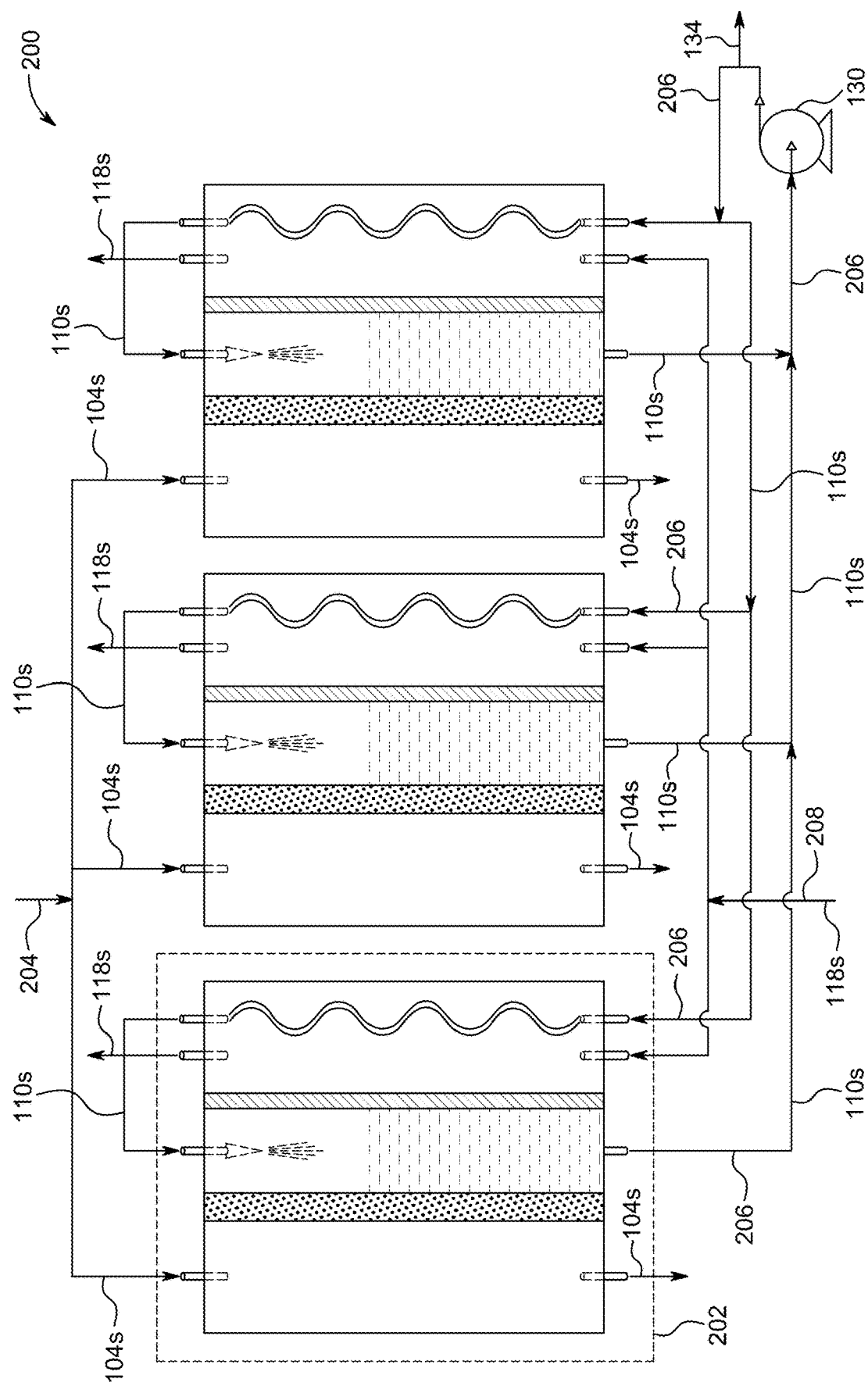
FIG. 4B schematically illustrates a multistage membrane distillation (MD) system with a plurality of MD modules that are fluidly connected in parallel.

Referring now to FIG. 4B, according to a third aspect, the present disclosure relates to a multistage membrane distillation system 200 including a plurality of the MD modules arranged in parallel relative to the feed line, wherein the feed inlets of the plurality of the membrane distillation modules are fluidly connected to a feed line 204. Accordingly, the feed stream 104s is delivered to the feed inlets in a parallel fashion. Similarly, the coolant inlets of the plurality of the MD modules are fluidly connected to a coolant line 208 and the coolant stream 118s is delivered to the coolant inlets in a parallel fashion. FIG. 4B represents a parallel feed/parallel coolant multistage arrangement. The arrangement of the distillate inlets, distillate outlets, and the branched circulating line 206 is substantially the same as the arrangement as in the multistage membrane distillation system of the second aspect.

The multistage membrane distillation system 200 may have alternative configurations, for example, a series feed/series coolant or a parallel feed/series coolant arrangement. In any of the configurations of the multistage membrane distillation system 200 a direction of the coolant stream may be co-current or counter-current relative to a direction of the feed stream.

In certain embodiments, the multistage membrane distillation system 200 may include more than 2, preferably 3-10, preferably 4-8 MD modules. The number of modules in the multistage membrane distillation system 200 may depend on a temperature difference between the coolant stream and the feed stream, wherein the temperature difference may preferably be maintained at 10-20° C., preferably about 10° C. For example, in one embodiment, the multistage membrane distillation system 200 includes three stages with a series feed/series coolant arrangement. In some embodiments, the feed stream may be re-heated and circulated back the multistage membrane distillation system 200, and/or the coolant stream may be re-cooled and circulated back to the multistage membrane distillation system 200.

The MD modules of the multistage membrane distillation system may be combined and inserted into a single module, wherein all lines and fluid connections are disposed in said module.

The efficiency of the MD module 100 or the multistage MD system 200 depends on the size of the MD module or the multistage MD system. For example, in one embodiment, the MD module 100 is a bench scale module that operates with an efficiency of 0.1-20 Wh, preferably 1-10 Wh per one liter of the distilled water produced. In some preferred embodiments, the efficiency of the multistage MD system 200 in accordance with the second or the third aspect ranges from 1-50 kWh, preferably 2-20 kWh, preferably 3-10 kWh, per one cubic meter of the distilled water produced.

A production capacity of the MD module 100 or the multistage MD system 200 depends on the size of the MD module or the multistage MD system. For example, in one embodiment, the MD module 100 is a bench scale module that produces distilled water at a production capacity of less than 150 L/h, preferably 30-120 L/h, preferably 60-100 L/h, per unit area (e.g. one square meter) of the hydrophobic membrane. In some preferred embodiments, the production capacity of a pilot-scale multistage MD system in accordance with the second or the third aspect ranges from 0.1 to 50 $m^3/d$ (cubic meters per day), preferably 0.5 to 40 $m^3/d$, and preferably 1.0 to 30 $m^3/d$. In some preferred embodiments, the production capacity of an industrial-scale multistage MD system 200 in accordance with the second or the third aspect ranges from 50 to 10000 $m^3/d$ (cubic meters per day), preferably 100 to 5000 $m^3/d$, preferably 200 to 4000 $m^3/d$.

According to a fourth aspect, the present disclosure relates to a method of desalinating the feed stream with the MD module.

Figure 6:
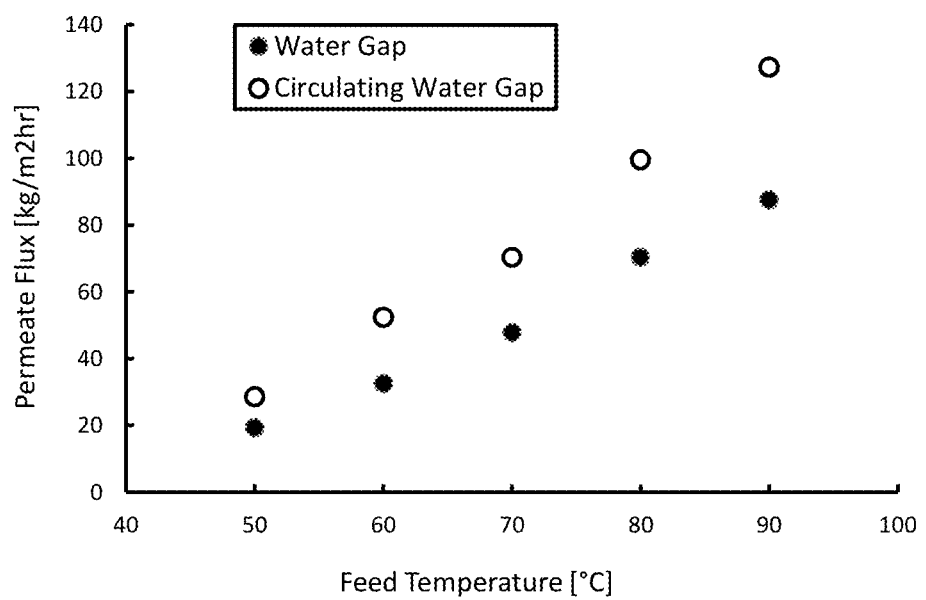
FIG. 6 represents a permeate flux of water vapor in the MD module over various temperatures of a feed stream, with and without the circulating line.

The method involves delivering the feed stream to the feed inlet. In some embodiments, the feed stream is delivered at a flow rate of 0.1-100 L/min, preferably 0.5-50 L/min, preferably 1.0-20 L/min, preferably 4-10 L/min, preferably about 6.0 L/min. The feed stream may have various temperatures. FIG. 6 represents the permeate flux of water vapor through a PTFE hydrophobic membrane at various temperatures of the feed stream. Accordingly, in some embodiments, the feed stream has a temperature of 30-90° C., preferably 40-90° C., preferably 60-90° C. The feed stream may preferably have an atmospheric pressure (i.e. a pressure of 0.95-1.05 atm), although in some embodiments, the feed stream is pressurized to a pressure of no more than 4 bars, preferably no more than 3 bars, preferably 1.5-2 bars before delivering to the feed inlet, to avoid membrane wetting.

In the embodiments where a multistage MD system in accordance with the second aspect of the present disclosure is used, the feed stream is delivered to the first membrane distillation module, as shown in FIG. 4A. In the embodiments where a multistage MD system in accordance with the third aspect of the present disclosure is used, the feed stream is delivered to the feed inlets in a parallel fashion, as shown in FIG. 4B.

The method further involves delivering the coolant stream to the coolant inlet. In some embodiments, the coolant stream is delivered at a flow rate of 0.1-100 L/min, preferably 0.5-50 L/min, preferably 1.0-20 L/min, preferably 4-10 L/min, preferably about 6.5 L/min. The flow rate of the coolant stream may preferably be substantially the same as the flow rate of the feed stream. The coolant stream may preferably have a temperature of no more than 25° C., preferably no more than 20° C., preferably 5-20° C., preferably 10-15° C. The coolant stream may preferably have an atmospheric pressure (i.e. a pressure of 0.95-1.05 atm), although in some embodiments, the coolant stream may be pressurized to a pressure of no more than 4 bars, preferably no more than 3 bars, preferably 1.5-2 bars before delivering to the coolant inlet.

In the embodiments where a multistage MD system in accordance with the second or the third aspect of the present disclosure is used, the coolant stream is delivered to the coolant inlets in a parallel fashion, as shown in FIGS. 4A and 4B.

Once the feed stream in delivered to the feed zone (or the feed zones of a multistage MD system), a portion of the water vapor of the feed stream permeates through the hydrophobic membrane (or hydrophobic membranes of a multistage MD system) and further condenses in the distillate zone (or distillate zones of a multistage MD system) in the form of distilled water.

The permeate flux of the water vapor depends on the type of the hydrophobic membrane and the temperature of the feed stream. In a preferred embodiment, the feed stream has a temperature of 30-90° C., preferably 50-90° C., preferably 60-90° C., wherein the permeate flux of the water vapor ranges from 30-140 kg/m$^2$/hr, preferably 40-130 kg/m$^2$/hr, preferably 45-130 kg/m$^2$/hr.

The method further involves circulating the distilled water in the circulating line and further injecting the distilled water into the distillate zone. The MD module of the present disclosure is a water-gap membrane distillation, and thus the distillate zone is filled with distilled water before delivering the feed stream to the feed zone. In some embodiments, the distillate zone is empty, and circulating the distilled water begins after delivering the feed stream to the feed zone, preferably when the distilled water reaches to a predetermined water level. The distilled water is preferably circulated in the circulating line at a flow rate of 0.1-5 L/min, preferably 0.2-4 L/min, preferably 0.5-3 L/min, preferably 1.0-2.0 L/min, preferably about 1.4 L/min, depending on the module dimensions. The distilled water may preferably be injected into the distillate zone at the abovementioned flow rates. In one embodiment, the distillate zone may preferably have an atmospheric pressure (i.e. a pressure of 0.95-1.05 atm) during circulating and injecting.

The examples below are intended to further illustrate protocols for the membrane distillation module, and are not intended to limit the scope of the claims.

Example 1

The flowing examples provide a design and a process to enhance the output permeate flux of the water gap membrane distillation (WGMD) module through injection and circulation of the distilled water inside the gap. Circulation and injection of the distilled water improves the heat and mass transfer through the membrane and thus resulting in a higher permeate flux. The flux was further increased by using the coolant channel as heat exchanger to cool the circulation stream.

The water gap, which separates the membrane and the cooling surface, is filled with stagnant distilled water. Distilled water inside the gap is recirculated from the module bottom side and injected, in a proper way based upon the module design, into the gap from the top side of the module using a circulating pump. The injections are in the form of small jets parallel to the membrane cold surface. Since the distilled water inside the gap is circulated and injected in a closed loop, no external water supply is encountered. Injecting and circulating water into the gap enhances the heat and mass transfer characteristics in the WGMD module and increase the flux due to the movement of water inside the gap on the cold side of the membrane. The proposed design increases the heat transfer coefficient inside the module and reduces the resistance to vapor mass transfer across the membrane. In addition, the design enhances the cooling and condensation processes inside the WGMD module. The power for pumping and circulating the distilled water is small since the pressure required for injection jets and recirculation is small. FIG. 2B shows the Water Gap MD process with gap water circulation and injection. According to the experimental results, 50% increase in flux (on average) was obtained compared to the normal WGMD system, when the gap water was injected and recirculated, as shown in FIG. 6.

Example 2

In another embodiment, to provide better cooling for the water inside the gap, the cooling channel of the module is used as a heat exchanger to cool the circulated water into the gap (see FIG. 2C). The circulated water exiting from the bottom of the module passes in a coil through the coolant chamber (channel) before being injected into the module gap from the top side. The coolant channel is fitted with a coil of high thermal conductivity material (e.g. copper) to be connected to the circulation cycle. This design helps in carrying out the excess heat transfer to the water gap through the membrane, and hence increases the temperature difference across the membrane and augments the condensation of permeated vapor in the water gap, and eventually increases the output flux of the system. This cooling process is a simple modification in the module design which may result in a small or negligible increase in energy consumption. However, the enhancement in the output flux is evident.

FIG. 3 shows the injection and circulation cycle for the distilled gap water using a small pump. Injection nozzles (two or more nozzles) are aligned to create water jets inside the gap on the cold side (distilled water side) of the membrane. These jets create turbulent flow inside the gap and enhance the heat and mass transfer across the membrane, and thus increase the permeate flux. Two jets are used to cover the effective area of the membrane, although more than two jets may be used alternatively. Injection pressure and flow rate are varied to obtain a maximum vapor mass transfer and a maximum permeate flux.

The distilled water is collected from a tube located at the top of the gap and its volume (or mass) is measured over the sampling time to calculate the system permeate flux.

Example 3

Figure 5:
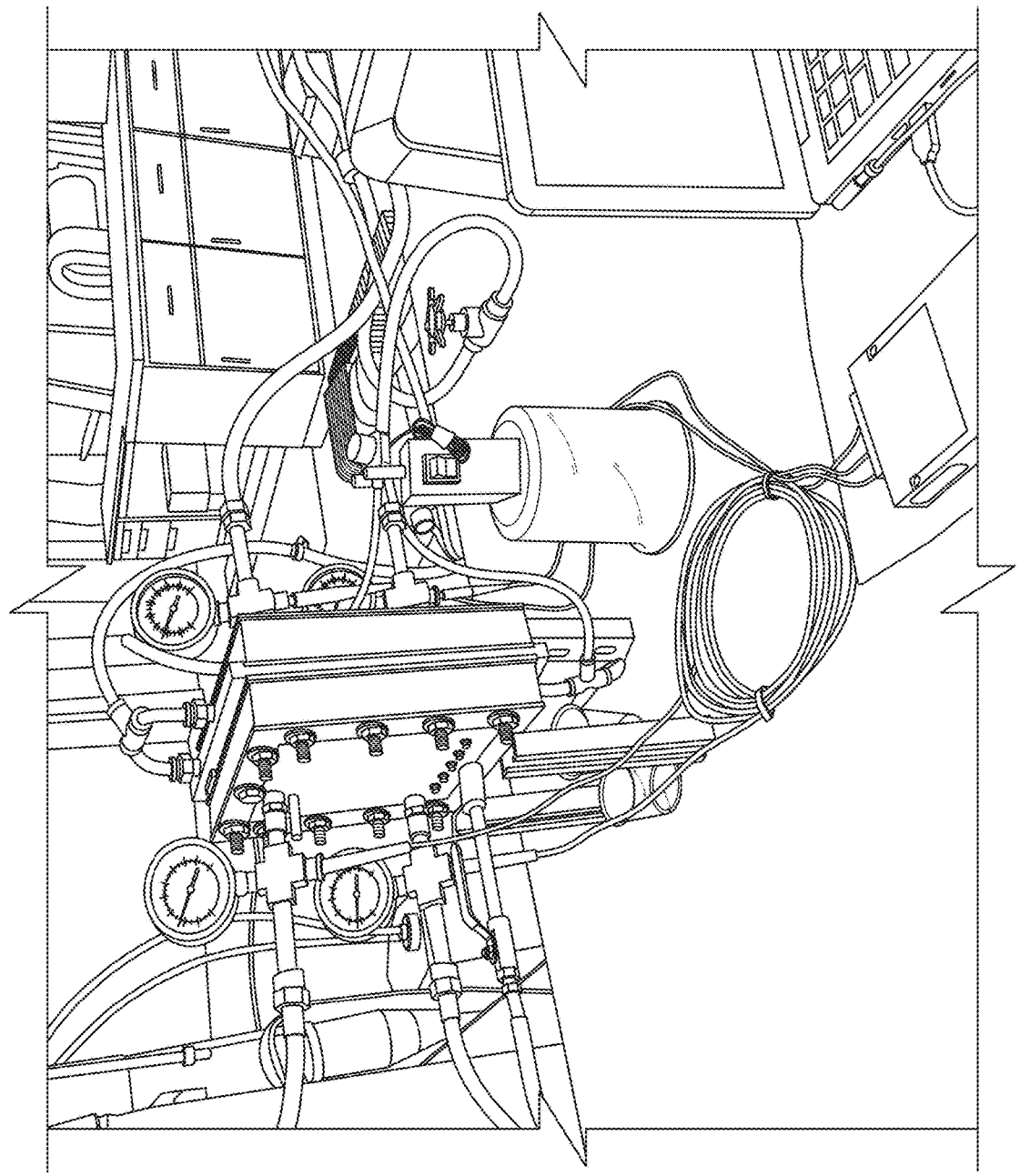
FIG. 5 is an image of a bench scale setup of the MD module.

Experiments were conducted to investigate the effects of circulating and injecting of the distilled gap water on the system flux. A water gap membrane distillation module was designed and manufactured as shown in FIG. 5. A hollow plastic frame of 6 mm thickness was used to create the gap space between the membrane cold side and the cooling plate. The frame was equipped with two injection nozzles from the top side of the gap and another two suction holes at the bottom side of the gap. A small circulating pump (6-Watt power) was used to circulate and inject the gap water. The module was operated at the following conditions: PTFE membrane with mean pore size of 0.22 µm, an effective gap width of 7.5 mm, a feed concentration of 3000 mg/L, a feed flow rate of 6 L/min, a coolant flow rate of 6.4 L/min, and a coolant temperature of 20° C. The pressure of distilled water during circulation and injection was set to be atmospheric, and the injection flow rate was set at 1.4 L/min.

Figure 7:
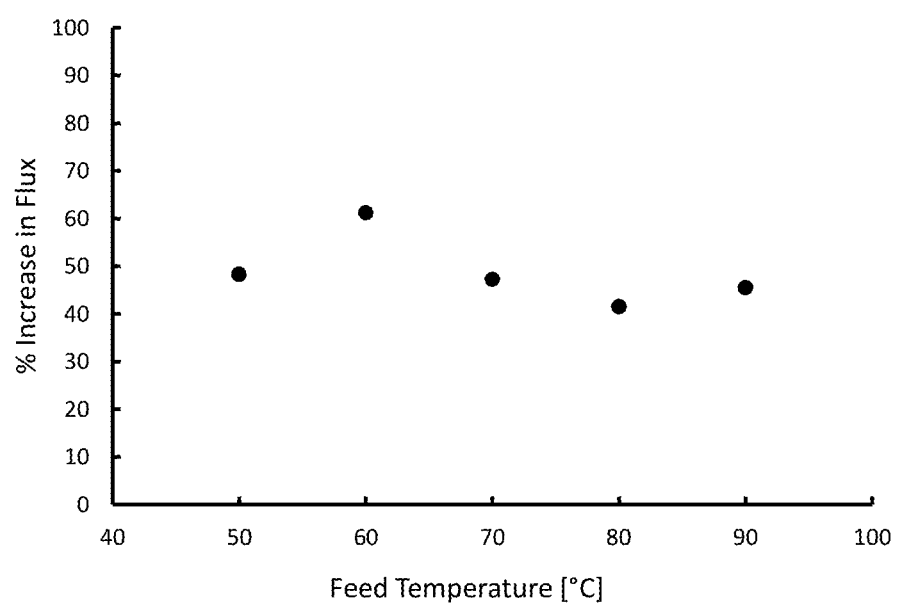
FIG. 7 represents a relative increase of the permeate flux of water vapor in the MD module, relative to a MD module that does not include a circulating line.

FIG. 6 represents a comparison between the permeate flux of the normal water gap MD system (without injection/circulation) and the proposed design of water gap MD system with gap injection and circulation, at different feed temperatures from 50 to 90° C. The permeate flux obtained from the water gap MD system of the present disclosure, i.e. having gap water circulation and injection, was found to be higher than the corresponding water gap MD system with stagnant water inside the gap. A flux of 128 kg/m²/h was achieved at a feed temperature of 90° C. when the distilled water was circulated. FIG. 7 shows the percentage increase in flux when the gap water was circulated compared to the stagnant gap water, at different feed temperatures. On average, 50% increase in flux was reported with maximum of 61% increase at feed temperature of 60° C. and 41% increase at feed temperature of 80° C. The TDS of the collected permeate was measured as 6 mg/L (6 ppm). Increasing the circulation flow rate and pressure increases the system flux.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A multistage membrane distillation system, comprising:
   a plurality of membrane distillation modules arranged in series, wherein the membrane distillation modules comprise:
   a vessel with an internal cavity;
   a hydrophobic membrane that divides the internal cavity into a feed zone and a distillate zone;
   a thermally conductive divider disposed in the distillate zone to separate a coolant zone from the distillate zone such that the distillate zone is sandwiched between the feed zone and the coolant zone;
   a feed inlet fluidly connected to the feed zone for delivering a feed stream to the feed zone, and a feed outlet fluidly connected to the feed zone for discharging the feed stream from the feed zone;
   a coolant inlet fluidly connected to the coolant zone for delivering a coolant stream to the coolant zone, and a coolant outlet fluidly connected to the coolant zone for discharging the coolant stream from the coolant zone;
   at least one distillate inlet and at least one distillate outlet fluidly connected to the distillate zone;
   a circulating line disposed outside of the distillate zone that fluidly connects the at least one distillate outlet to the at least one distillate inlet; and
   a pump fluidly connected to the circulating line;
   wherein the feed stream comprises water and water vapor, and a portion of the water vapor permeates through the hydrophobic membrane and condenses in the distillate zone in the form of distilled water,
   wherein the pump circulates at least a portion of the distilled water in the circulating line,
   wherein at least a portion of the circulating line is disposed in the coolant zone with a coil shape such that the distilled water of the circulating line heat exchanges with the coolant stream; and
   wherein the hydrophobic membrane is a flat membrane sandwiched in a frame with the conductive divider and a perforated supporting plate;
   wherein the feed outlet of each membrane distillation module is fluidly connected to the feed inlet of a subsequent membrane distillation module and the feed stream is delivered to the feed inlet of a first membrane distillation module,
   wherein the coolant inlets of the plurality of the membrane distillation modules are fluidly connected to a coolant line and the coolant stream is delivered to the coolant inlets with the coolant line in a parallel fashion,
   wherein the distillate inlets of the plurality of the membrane distillation modules are fluidly connected to the distillate outlets of the plurality of the membrane distillation modules with a branched circulating line, and
   wherein the distilled water is circulated inside the branched circulating line with the pump.

2. The multistage membrane distillation system of claim 1, wherein at least a portion of the branched circulating line is disposed in at least one coolant zone of the plurality of the membrane distillation modules such that the distilled water inside the branched circulating line heat exchanges with the coolant stream.

* * * * *